Sept. 8, 1925.
G. J. MOHR
1,552,495
COMBINATION TOOL
Filed Jan. 28, 1922
2 Sheets-Sheet 1
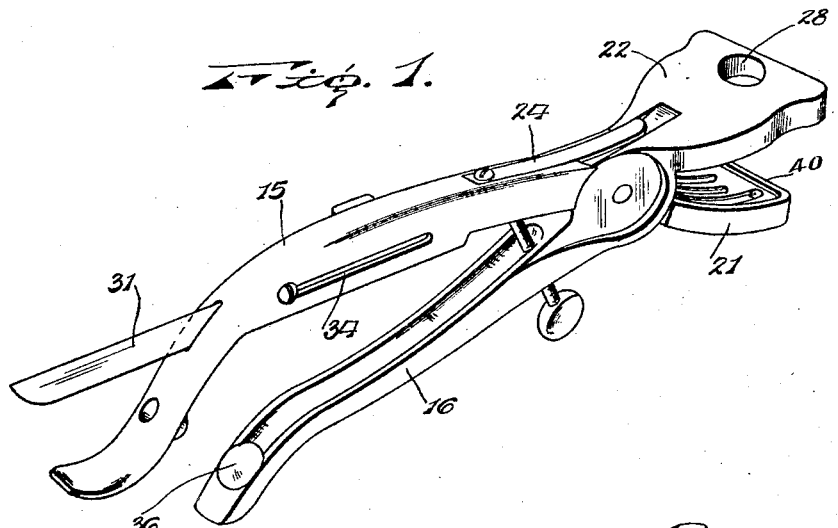
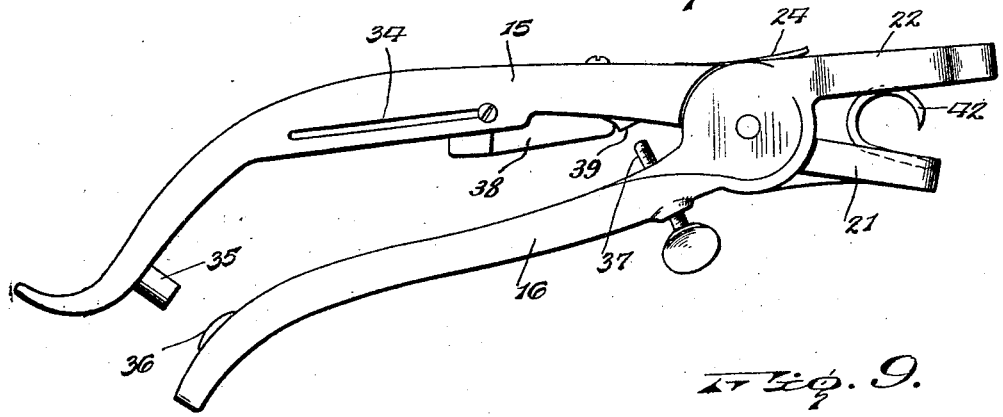
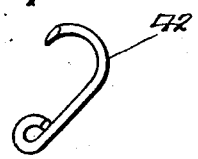
Inventor
G. J. Mohr.
By Lacey & Lacey, Attorneys

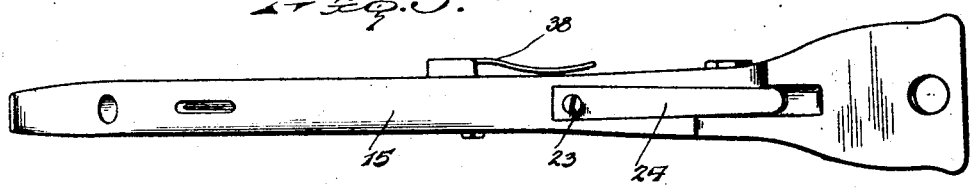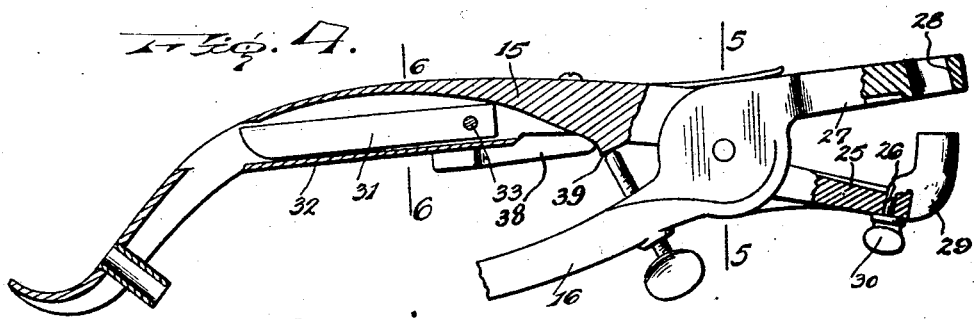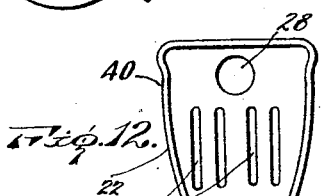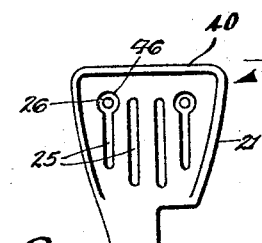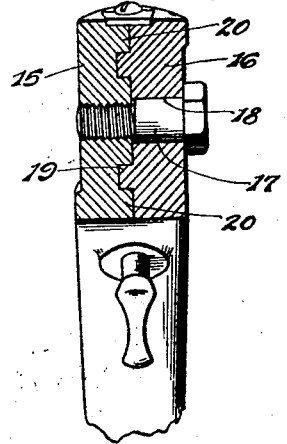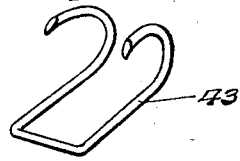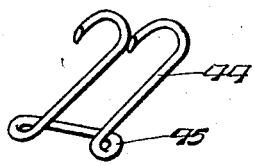

Patented Sept. 8, 1925.

1,552,495

UNITED STATES PATENT OFFICE.

GEORGE J. MOHR, OF ROCK ISLAND, ILLINOIS.

COMBINATION TOOL.

Application filed January 28, 1922. Serial No. 532,374.

*To all whom it may concern:*

Be it known that I, GEORGE J. MOHR, a citizen of the United States, residing at Rock Island, in the county of Rock Island and State of Illinois, have invented certain new and useful Improvements in Combination Tools, of which the following is a specification.

My invention relates to combination tools and has for its object to provide an implement with which several different operations may be performed, without the necessity of altering or interchanging any parts of the tool. This implement is intended principally for use on a farm to perform such sundry operations as ringing hogs, punching and riveting saddlery, cutting articles such as leather, wood, rope, etc., and for general utility. It is built in the shape of a pair of tongs with specifically constructed jaws and handle shanks, and is provided with means for hitching it to a belt or the clothing on a person.

Another object of the invention is to provide a firm joint for the jaws, so that they may work easily but yet without looseness.

In the accompanying drawings:

Figure 1 represents a perspective view of my combination tool;

Fig. 2, a side elevation thereof;

Fig. 3, a top plan view;

Fig. 4, another side elevation partly in section;

Fig. 5, a transverse section along line 5—5 of Fig. 4;

Fig. 6, another transverse section along line 6—6 of Fig. 4;

Figs. 7, 8, 9, 10, and 11 represent different constructions of rings and hooks intended for use with my tool;

Fig. 12 is a bottom plan view of the upper jaw; and

Fig. 13 is a top plan view of the lower jaw.

The tool consists of two shanks 15 and 16 curved so as to be comfortably engaged by the hand. These two shanks are hinged together and the hinge includes a pivot pin 17 threaded in one of the shanks 15 and running in a smooth hole 18 in the shank 16. Coaxially with the pin 17 are provided on the contiguous surfaces of the two shanks 15 and 16, annular collars 19, 20, interengaging with each other so as to form a firm connection between the two shanks without causing any looseless in the operation thereof.

The upper shank 15 is provided with a lower jaw 21 and the lower shank 16 with an upper jaw 22 and on top of the upper shank 15 is secured preferably by means of a screw 23, a flat spring 24 resting with its forward end beyond the hinge point on the upper jaw 22 thereby pressing the jaws together. The lower jaw 21 is provided with a number of longitudinal grooves 25 terminating with small holes 26 and the upper jaw 22 with similar grooves 27 which, however, do not need to have any perpendicular openings, see Figs. 12 and 13. The upper jaw 22 is instead provided with a large opening 28 in the protruding portion thereof and which does not register with any corresponding part on the lower jaw 21. The small holes 26 in the lower jaw are intended to receive a tooth 29 held in position by means of a thumb-nut 30 and seated on the lower jaw in such a manner that its upper part will enter the aperture 28 in the upper jaw when the jaws are closed. This tooth is intended for punching holes. Along two sides and the front edge of each jaw is furnished a low marginal ledge 40 for retaining the partly bent wire in position during operation.

The upper shank 15, which is preferably made hollow or of U-section, is constructed to receive the sliding blade 31 which is guided by the wall 32 in the shank and also by a stud 33 running in a longitudinal slot 34 formed in the shank. When not in use the blade 31 is concealed in the shank 15 as indicated in Fig. 4, when the stud 33 is at the inner end of the slot 34, but when in use the blade is pushed out by means of the stud until the latter strikes the other end of the slot 34, when the blade 31 will protrude through the upper shank 15 as indicated in Fig. 1 when the tool is intended to be used as a knife for cutting sundry articles.

At the extreme end of the upper shank 15 is positioned a cylindrical punch 35 which is to cooperate with an anvil 36 formed at the end of the lower shank 16. This device is used for punching holes in leather and the like and for riveting together several layers of leather when a rivet is placed in the cylinder 35 and the parts pressed together against the anvil 36.

A thumb-screw 37 is provided close to the hinge portion of the tool and threaded in the lower shank 16 engaging at its free end a flat projection 39 in the upper shank. By screwing in or out this screw 37 the opening between the jaws 21 and 22 can be adjusted as the screw 37 will form a stop for the movement of the shanks 15 and 16.

On one side of the implement I provide a hook 38 for the purpose of suspending the tool from the belt or the clothing of the person. This hook is preferably made of spring steel or spring brass in order to exert a pressure against the side of the shank and by this means it can hold the tool securely in any position on the person.

In Figs. 7 to 11 inclusive I have shown a few different kinds of rings and hooks for ringing hogs. The rings all fit in the grooves of the jaws 21 and 22; for instance the open ring 40' shown in Fig. 9 may be pushed into the grooves between jaws 21 and 22 and held firmly by the spring 24. By now pressing on the shanks 15 and 16 the ring will close and the tool may thereupon be removed before taking another ring. Similarly the open ring 41 shown in Fig. 8 should be inserted between the jaws of the implement and would form a diamond or triangular-shape ring when pressed together. In Fig. 7 I have shown a fishhook ring 42 which is also indicated in Fig. 2 in position between the jaws. All the rings so far described are single ones and only engage between a single pair of grooves in the upper and lower jaws.

In Figs. 10 and 11 I have shown double fishhook rings 43 and 44 which engage in a pair of grooves in each jaw, when inserted between them and the loops 45 of the hook 44 are intended to fall into the enlargements 46 around the holes 26 as seen in Fig. 13, whereupon the pointed ends of the hooks enter the loops 45 and become locked thereby, when pressure is exerted on the shanks 15 and 16.

Having thus described the invention what is claimed as new is:

An implement of the character of a pair of tongs comprising a pair of cooperating members, each member having a jaw and a handle shank, a joint for said members including an annular collar on one of the members engaging in a corresponding groove provided on the other member, a pivot pin holding the members together, the opposing faces of said jaws having flat recesses with longitudinal grooves adapted to receive and retain a hook in upright position, a spring secured on the shank of one of said members and engaging the jaw of the other member for pressing the jaws together over the hook, and means for limiting the space between said jaws including a set screw carried by one shank and a heel on the other shank.

In testimony whereof I affix my signature.

GEORGE J. MOHR. [L. s.]